(12) United States Patent
Wang et al.

(10) Patent No.: US 9,542,025 B2
(45) Date of Patent: Jan. 10, 2017

(54) DISPLAY PANEL, MANUFACTURING METHOD OF THE SAME, AND DISPLAY DEVICE

(71) Applicant: BOE TECHNOLOGY GROUP CO., LTD., Beijing (CN)

(72) Inventors: Can Wang, Beijing (CN); Wei Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 15 days.

(21) Appl. No.: 14/428,478

(22) PCT Filed: Jun. 30, 2014

(86) PCT No.: PCT/CN2014/081187
§ 371 (c)(1),
(2) Date: Mar. 16, 2015

(87) PCT Pub. No.: WO2015/106547
PCT Pub. Date: Jul. 23, 2015

(65) Prior Publication Data
US 2016/0026310 A1   Jan. 28, 2016

(30) Foreign Application Priority Data
Jan. 16, 2014   (CN) .......................... 2014 1 0021587

(51) Int. Cl.
*G06F 3/041*   (2006.01)
*G06F 3/044*   (2006.01)

(52) U.S. Cl.
CPC ............. *G06F 3/0412* (2013.01); *G06F 3/044* (2013.01); *G06F 2203/04103* (2013.01)

(58) Field of Classification Search
None
See application file for complete search history.

(56) References Cited

U.S. PATENT DOCUMENTS

2012/0114923 A1* 5/2012 Haishi .................... G06F 3/044
428/213
2014/0139459 A1* 5/2014 Wu ........................ G06F 3/0416
345/173

FOREIGN PATENT DOCUMENTS

CN   101476109 A   7/2009
CN   202748752 U   2/2013
(Continued)

OTHER PUBLICATIONS

International Search Report for International Application No. PCT/CN2014/081187.
(Continued)

*Primary Examiner* — Kenneth B Lee, Jr.
(74) *Attorney, Agent, or Firm* — Nath, Goldberg & Meyer; Joshua B. Goldberg

(57) ABSTRACT

A display panel includes a touch scanning electrode and a touch sensing electrode. One of the touch scanning electrode and the touch sensing electrode is provided with at least one separation layer therein or both the touch scanning electrode and the touch sensing electrode are provided with at least one separation layer therein respectively, and the at least one separation layer separates the touch scanning electrode or the touch sensing electrode which is provided with the at least one separation layer into at least two electrode sub-layers, wherein, the at least two electrode sub-layers are made of an electrode material capable of being transformed from an amorphous state into a polycrystalline state, and the at least one separation layer is used for preventing the electrode material from being subject to a crystallization reaction before a crystallization process.

14 Claims, 2 Drawing Sheets

(56) References Cited

FOREIGN PATENT DOCUMENTS

| | | | |
|---|---|---|---|
| CN | 103366867 A | 10/2013 | |
| CN | 103777814 A | 5/2014 | |
| JP | 2004268311 A | 9/2004 | |
| JP | 2012-012687 A | 1/2012 | |
| JP | 2012012687 A | 1/2012 | |

OTHER PUBLICATIONS

The First Office Action dated Apr. 5, 2016 corresponding to Chinese application No. 201410021587.4.
Written Opinion of the International Searching Authority dated Sep. 21, 2014 corresponding to International application No. PCT/CN2014/081187.

* cited by examiner

DISPLAY PANEL, MANUFACTURING METHOD OF THE SAME, AND DISPLAY DEVICE

This is a National Phase Application filed under 35 U.S.C. 371 as a national stage of PCT/CN2014/081187, filed Jun. 30, 2014, an application claiming the benefit of Chinese Application No. 201410021587.4, filed Jan. 16, 2014, the content of each of which is hereby incorporated by reference in its entirety.

FIELD OF THE INVENTION

The present invention relates to the field of display technology, and in particular, relates to a display panel, a manufacturing method of the same, and a display device.

BACKGROUND OF THE INVENTION

Along with continuous improvement of the technology of display panel and its manufacturing process, the research on integrating the function of a touch panel with a liquid crystal panel becomes increasingly popular. As compared with a traditional method of arranging the touch panel on the liquid crystal panel, the integration technologies of a built-in touch panel mainly include two different types: on-cell touch and in-cell touch. The difference between the on-cell touch and the in-cell touch lies in that, in the in-cell touch the function of the touch panel is embedded into liquid crystal pixels, while in the on-cell touch the function of the touch panel is embedded between a color-filter substrate (also referred to as a color filter) and a polarizer.

Specifically, the on-cell touch means that the function of the touch panel is integrated into the color-filter substrate. However, the in-cell touch means that a touch electrode assembly (which includes scanning electrodes or touch sensing electrodes) in the touch panel is formed on a plain glass (i.e., blank glass), which is then attached to a color-filter substrate, and then the resulted touch electrode assembly is embedded into liquid crystal pixels; alternatively, the touch electrode assembly in the touch panel is directly formed in a color-filter substrate or an array substrate. As compared with the on-cell touch panel, the built-in touch panel of in-cell touch has advantages of being thin and lightweight, which facilitates to reduce the manufacturing cost and decrease the thickness of the panel.

At present, for the purpose of making the panel of a capacitive touch screen thinner, there is provided an embedded capacitive touch screen in which touch electrodes are formed in the color-filter substrate or the array substrate. For example, a touch function is achieved by additionally adding touch electrodes directly onto an existing array substrate. That is, two layers of strip electrodes are formed in a manner of being noncoplanar and cross each other on a surface of the array substrate, and are generally made of indium tin oxide (ITO). Inductive capacitance occurs at a position where the two strip electrodes are noncoplanar and cross each other. It is determined whether a point is touched (i.e., a touch point) by detecting whether the value of the capacitance at the corresponding position changes or not.

As the resolution of display panel products increases, an increasing accuracy of the touch electrode is required, which makes a line-width of the strip electrode tend to decrease. However, according to the law of resistance (i.e., the following equation (1)):

$$R=\rho l/s=\rho l/ab \quad (1)$$

Where, for the strip electrode, R is the resistance value of the electrode, $\rho$ is the resistivity determined by the material forming the electrode, l is the length of the electrode, s is the cross-sectional area of the electrode, a is the line-width of the electrode, and b is the thickness of the electrode.

It can be seen that, as the line-width a of the strip electrode decreases with other parameters remaining unchanged, the resistance value R of the electrode will increase accordingly, which causes the signal delay during a touch process to be increased and causes the touch sensitivity to be decreased. In order to decrease the resistance value R of the strip electrode, a solution which can be employed at present is to increase the thickness b of each of a touch scanning electrode and a touch sensing electrode. However, in a practical manufacturing process, the difficulty of a process for manufacturing a touch electrode as originally designed will increase if only the thickness b of each of the electrodes is increased. For example, during a film formation process for forming an amorphous ITO film, since a large thickness of a touch electrode is required, the ITO will be subject to a crystallization reaction so as to crystallize partially at a temperature equal to or higher than 150° C. Generally, an effect of an etching process (which is mainly a wet etching) performed on the amorphous ITO film is better than on the crystallized ITO film. The crystallization of the ITO will result in a problem of nonuniform etching in the subsequent etching process, which will cause a defect in the resultant product.

Therefore, the problem regarding how to not only reduce a signal delay during a touch process but also guarantee a rate of qualified product has becomes a technical problem to be solved urgently at present.

SUMMARY OF THE INVENTION

In view of the above problems existing in the prior art, the technical problem to be solved by the present invention is to provide a display panel, a manufacturing method of the same, and a display device. A touch sensing electrode and/or a touch scanning electrode in the display panel have/has a relatively small resistance. Thus, not only the signal delay during the touch process can be reduced effectively, but also the rate of qualified product is guaranteed.

A technical solution employed to solve the technical problem of the present invention is a display panel including a touch scanning electrode and a touch sensing electrode, wherein, one of the touch scanning electrode and the touch sensing electrode is provided with at least one separation layer therein or both the touch scanning electrode and the touch sensing electrode are provided with at least one separation layer therein respectively, the at least one separation layer separates the touch scanning electrode or the touch sensing electrode which is provided with the at least one separation layer into at least two electrode sub-layers, the at least two electrode sub-layers are made of an electrode material capable of being transformed from an amorphous state into a polycrystalline state, and the at least one separation layer is used for preventing the electrode material from being subject to a crystallization reaction before a crystallization process.

Preferably, the at least one separation layer is made of a metal conductive material having a low resistivity and a light transmittance equal to or greater than 60%.

Preferably, the electrode material includes any one of or a combination of two or more of indium zinc oxide, indium tin oxide, indium oxide, and zinc oxide.

Preferably, the metal conductive material includes any one of or an alloy of two or more of Cr, W, Ti, Ta, Mo, AlNd, Cu, Ag, and Al.

Preferably, a sum of thicknesses of all of the at least two electrode sub-layers which constitute the touch scanning electrode or the touch sensing electrode and the at least one separation layer is within a predetermined thickness range for the touch scanning electrode or the touch sensing electrode, and the predetermined thickness range is from 800 Å to 6000 Å.

Preferably, a total number of the at least one separation layer is equal to or less than 5, a thickness of each of the at least one separation layer ranges from 10 Å to 50 Å, and a thickness of each of the at least two electrode sub-layers ranges from 400 Å to 1000 Å.

Further preferably, the touch scanning electrode and the touch sensing electrode both are strip shape, and are non-coplanar and cross each other.

Preferably, the display panel includes an array substrate, both the touch scanning electrode and the touch sensing electrode are arranged in the array substrate; or the display panel includes a color-filter substrate and an array substrate, the touch scanning electrode is arranged in the color-filter substrate while the touch sensing electrode is arranged in the array substrate, or the touch scanning electrode is arranged in the array substrate while the touch sensing electrode is arranged in the color-filter substrate; or, both the touch scanning electrode and the touch sensing electrode are arranged in the color-filter substrate or in the array substrate.

The present invention further provides a display device including the display panel as described above.

The present invention further provides a manufacturing method of a display panel, including steps of forming a touch scanning electrode and forming a touch sensing electrode, wherein, the step of forming the touch scanning electrode and/or forming the touch sensing electrode includes:

forming an amorphous electrode sub-layer film, a separation layer film, and an amorphous electrode sub-layer film successively on a substrate;

performing a patterning process on the amorphous electrode sub-layer film, the separation layer film, and the amorphous electrode sub-layer film, so as to form a pattern including the touch scanning electrode or the touch sensing electrode; and crystallizing the touch scanning electrode and/or the touch sensing electrode made of an electrode material capable of being transformed from an amorphous state into a polycrystalline state.

Preferably, before performing the patterning process on the amorphous electrode sub-layer film, the separation layer film, and the amorphous electrode sub-layer film, the manufacturing method further includes forming additional separation layer films and additional amorphous electrode sub-layer films successively on the electrode sub-layer film which is far away from the substrate, until a sum of thicknesses of all of the amorphous electrode sub-layer films which constitute the touch scanning electrode or the touch sensing electrode and the separation layer films is within a predetermined thickness range for the touch scanning electrode or the touch sensing electrode, wherein the predetermined thickness range is from 800 Å to 6000 Å.

Preferably, the substrate is a color-filter substrate which is used for forming a color-filter layer thereon or an array substrate which is used for forming an array of thin film transistors thereon.

Preferably, the forming of the amorphous electrode sub-layer film is performed by a sputtering deposition process of which a deposition temperature ranges from 20° C. to 30° C., and the forming of the separation layer film is performed by a sputtering deposition process of which a deposition temperature ranges from 10° C. to 50° C.

Preferably, the crystallizing of the touch scanning electrode and/or the touch sensing electrode made of an electrode material capable of being transformed from an amorphous state into a polycrystalline state is performed by an annealing process.

The advantageous effects of the present invention are as follows. By providing at least one relatively thin separation layer in a relatively thick touch electrode (including a touch scanning electrode and/or a touch sensing electrode), the display panel can not only reduce the signal delay during the touch process effectively so as to increase the sensitivity of the touch, but also prevent the electrode material used for forming the touch electrode from being crystallized during the film forming process, thus the etching uniformity of an etching process is increased, so that the rate of qualified product is increased.

BRIEF DESCRIPTION OF THE DRAWINGS

FIGS. 2A to 2E are flowcharts showing a manufacturing process for forming the touch sensing electrode/the touch scanning electrode of FIG. 1, wherein:

FIG. 2A is a sectional view of forming an electrode sub-layer film on a substrate;

FIG. 2B is a sectional view of forming a separation layer film on the substrate of FIG. 2A;

FIG. 2C is a sectional view of forming an electrode sub-layer film on the substrate of FIG. 2B;

FIG. 2D is a sectional view of forming, on the substrate of FIG. 2C, an electrode sub-layer film and a separation layer film cyclically to reach a predetermined thickness range; and FIG. 2E is a sectional view showing that the structure of FIG. 2D is formed into a touch electrode by a patterning process.

REFERENCE NUMERALS

Figure 1:
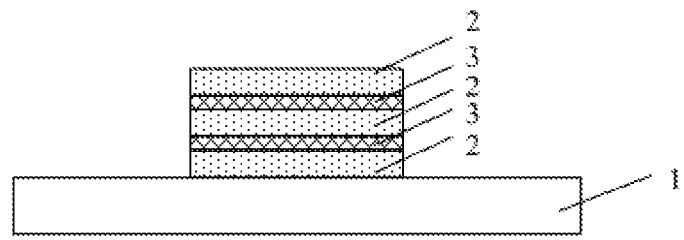
FIG. 1 is a schematic diagram showing a structure of a touch sensing electrode/a touch scanning electrode according to Embodiment 1 of the present invention.

1—substrate;
20—electrode sub-layer film;
2—electrode sub-layer;
30—separation layer film;
3—separation layer.

DETAILED DESCRIPTION OF THE EMBODIMENTS

For better understanding the technical solutions of the present invention by a person skilled in the art, a display panel, a manufacturing method of the same, and a display device according to the present invention will be further described in detail below with reference to the accompanying drawings and specific embodiments.

The present invention provides a display panel including a touch scanning electrode and a touch sensing electrode, wherein, one of the touch scanning electrode and the touch sensing electrode is provided with at least one separation layer therein or both the touch scanning electrode and the touch sensing electrode are provided with at least one separation layer therein respectively. The at least one separation layer separates the touch scanning electrode or the touch sensing electrode which is provided with the at least one separation layer into at least two electrode sub-layers, wherein, the at least two electrode sub-layers are made of an electrode material capable of being transformed from an amorphous state into a polycrystalline state, and the at least one separation layer is used for preventing the electrode material from being subject to a crystallization reaction before a crystallization process.

The present invention further provides a display device including the display panel as described above.

The present invention further provides a manufacturing method of a display panel, including steps of forming a touch scanning electrode and forming a touch sensing electrode, wherein, the step of forming the touch scanning electrode and/or forming the touch sensing electrode includes:

forming an amorphous electrode sub-layer film, a separation layer film, and an amorphous electrode sub-layer film successively on a substrate;

performing a patterning process on the above-mentioned amorphous electrode sub-layers films and the separation layer film, so as to form a pattern including the touch scanning electrode or the touch sensing electrode; and crystallizing the touch scanning electrode and/or the touch sensing electrode.

Embodiment 1

The present embodiment provides a display panel including a touch scanning electrode and a touch sensing electrode, wherein, one of the touch scanning electrode and the touch sensing electrode is provided with at least one separation layer therein or both the touch scanning electrode and the touch sensing electrode are provided with at least one separation layer therein respectively. The at least one separation layer separates the touch scanning electrode or the touch sensing electrode which is provided with the at least one separation layer into at least two electrode sub-layers. The at least two electrode sub-layers are made of an electrode material capable of being transformed from an amorphous state into a polycrystalline state, and the at least one separation layer is used for preventing the electrode material from being subject to a crystallization reaction before a crystallization process.

That is, the improvement of a touch electrode component in the present embodiment includes three schemes as follows: either the touch scanning electrode or the touch sensing electrode may be provided with the separation layer therein, or both the touch scanning electrode and the touch sensing electrode are provided with the separation layer therein respectively. The separation layer is used for blocking a crystallization reaction, which may occur during the film forming process, of an electrode material which forms the touch scanning electrode and the touch sensing electrode and which is capable of being transformed from an amorphous state into a polycrystalline state, meanwhile it is guaranteed that each of the formed touch scanning electrode and touch sensing electrode has a relatively small resistance value. In subsequent description, a touch electrode may refer to the touch scanning electrode and/or the touch sensing electrode.

As shown in FIG. 1, the touch electrode in the present embodiment includes an electrode sub-layer 2, a separation layer 3, an electrode sub-layer 2, a separation layer 3, and an electrode sub-layer 2 which are arranged successively on a substrate 1. Since the touch electrode which is relatively thick is provided with the separation layers 3 therein, it can effectively prevent an electrode material from being subject to a crystallization reaction during the film forming process of the touch electrode in a manufacturing process for forming the touch electrode.

In order to ensure that the touch electrode has a good electrical conductivity and a good light transmittance, preferably, each of the separation layers 3 is made of a metal conductive material having a low resistivity and a light transmittance equal to or greater than 60%.

In the present embodiment, an electrode material forming each of the electrode sub-layers 2 includes any one of or a combination of two or more of indium zinc oxide (IZO), indium tin oxide (ITO), indium oxide ($In_2O_3$), and zinc oxide (ZnO). The metal conductive material includes any one of or an alloy of two or more of Cr, W, Ti, Ta, Mo, AlNd, Cu, Ag, and Al.

In order to ensure the sensitivity of a touch, the thickness of each of the touch scanning electrode and the touch sensing electrode is from 800 Å to 6000 Å, and preferably, is from 2000 Å to 5000 Å. Correspondingly and preferably, the total number of the separation layers 3 is equal to or less than 5, the thickness of each separation layer 3 ranges from 10 Å to 50 Å; and the thickness of each of the electrode sub-layers 2 ranges from 400 Å to 1000 Å. As the total number of the separation layers 3 increases, the effect of the separation layers 3 blocking the electrode material from being crystallized is better; which, however, will cause a light transmittance of the touch electrode to decrease. Therefore, the total number of the separation layers may be appropriately set according to requirements of the thickness and the light transmittance of the touch electrode in a practical application.

In the present embodiment, since the metal material forming each of the separation layers 3 is a commonly used metal material for sputtering, such as Mo, AlNd, Cu, Ag, Al, or the like, and each of these metal materials has a light transmittance of about 70% at a thickness of about 50 Å, addition of a separation layer thinner than 50 Å has a very little effect on the light transmittance of a resultant touch electrode in consideration that the electrode material (e.g., ITO) itself has a light transmittance of about 80%. Specifically, the light transmittance of each of several metal materials at a certain thickness is as follows: Mo: 50 Å, 64%; AlNd: 50 Å, 64.7%; Al: 50 Å, 77.8%.

In general, the touch scanning electrode and the touch sensing electrode both are strip shape, and are noncoplanar and cross each other. The display panel may be a liquid crystal display panel, and the display panel includes a color-filter substrate and an array substrate. The color-filter substrate include a color-filter layer, and the array substrate includes a plurality of thin film transistors (TFTs, or may be referred to as thin film field effect transistors) arranged in an array. In the present embodiment, the touch scanning electrode may be arranged in the color-filter substrate while the touch sensing electrode may be arranged in the array substrate, or the touch scanning electrode may be arranged in the array substrate while the touch sensing electrode may be arranged in the color-filter substrate; alternatively, both the touch scanning electrode and the touch sensing electrode may be arranged in the color-filter substrate or the array substrate.

The touch electrode in the present embodiment may be either of capacitive on-cell touch mode or of capacitive in-cell touch mode. The working process of this capacitive touch mode is as follows: when a touch scanning signal is loaded on the touch scanning electrode, a voltage signal, which is resulted from coupling of the touch sensing electrode through inductive capacitance, is detected; during this process, when a human body contacts a touch screen, an electric field of the human body will have an influence on the inductive capacitance, so that a value of the inductive capacitance varies; thus, the voltage signal which is resulted from coupling of the touch sensing electrode is changed; and the position of a touch point is determined according to the change of the voltage signal.

Correspondingly, the present embodiment further provides a manufacturing method of a display panel, including steps of forming a touch scanning electrode and forming a touch sensing electrode, wherein, the step of forming the touch scanning electrode and/or forming the touch sensing electrode includes:

Step S1: forming an amorphous electrode sub-layer film, a separation layer film, and an amorphous electrode sub-layer film successively on a substrate.

In the present step, a film structure used for a touch electrode is formed mainly by a film forming process. Here, the amorphous electrode sub-layer film is made of an electrode material which is capable of being transformed from an amorphous state into a polycrystalline state, for example, is made of amorphous ITO (a-ITO).

Wherein, the substrate is a color-filter substrate which is used for forming a color-filter layer thereon or an array substrate which is used for forming an array of thin film transistors thereon. It is easily understood that, the substrate may also be plain glass. Each of the amorphous electrode sub-layer films is formed by a sputtering deposition process of which a deposition temperature ranges from 20° C. to 30° C., and the separation layer film is formed by a sputtering deposition process of which a deposition temperature ranges from 10° C. to 50° C.

Figure 2A:
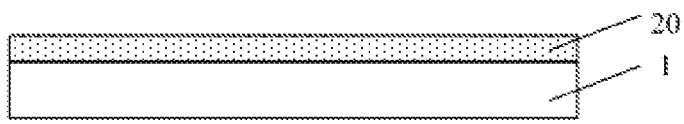

As shown in FIG. 2A, at a normal temperature (e.g., 25° C.), amorphous ITO (a-ITO) is sputtered and deposited on a substrate 1 on which a touch electrode is to be formed by a mature and commonly used process (the used process is not specifically limited herein), so as to form an electrode sub-layer film 20 whose thickness may ranges from 400 Å to 1000 Å.

Figure 2B:
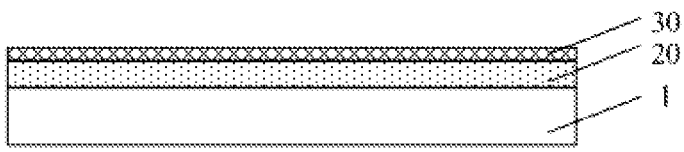

As shown in FIG. 2B, at a normal temperature (e.g., 10° C.-50° C.), a relative thin layer of metal material is sputtered and deposited on the substrate 1 on which the electrode sub-layer film 20 has been formed, so as to form a separation layer film 30 whose thickness may be 50 Å or less (e.g., 10 Å-50 Å), such that crystallization of the electrode sub-layer film 20 is prevented. In general, the metal material is subject to film formation at a high temperature (e.g., 200° C.-400° C.). In the present embodiment, the metal material is subject to film formation at a normal temperature, so as to prevent the electrode sub-layer film 20 which is crystallized easily from being crystallized. Thus, the resistance of the electrode sub-layer film 20 will not be affected.

Figure 2C:
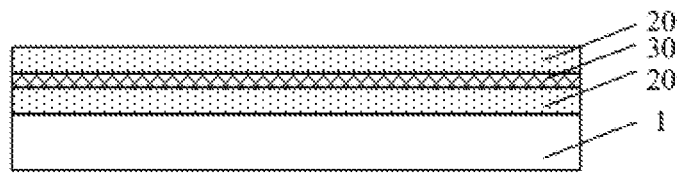

As shown in FIG. 2C, at a normal temperature, an amorphous electrode sub-layer film 20 is sputtered and deposited once again on the substrate 1 on which the separation layer film 30 has been formed, and the thickness of this electrode sub-layer film 20 may also ranges from 400 Å to 1000 Å.

In order to ensure the sensitivity of a touch, the thickness of the touch electrode may be increased to reduce the resistance value of the touch electrode. In order to ensure that the thickness of each of the touch scanning electrode and the touch sensing electrode is within a predetermined thickness range, before performing a patterning process on the amorphous electrode sub-layer film, the separation layer film, and the amorphous electrode sub-layer film, the manufacturing method further includes a step of further forming additional separation layer films and additional amorphous electrode sub-layer films successively on the electrode sub-layer film which is far away from the substrate, until a sum of thicknesses of all of the amorphous electrode sub-layer films which constitute the touch scanning electrode or the touch sensing electrode and the separation layer films is within a predetermined thickness range for the touch scanning electrode or the touch sensing electrode, and the predetermined thickness range is from 800 Å to 6000 Å, preferably from 2000 Å to 5000 Å.

Figure 2D:
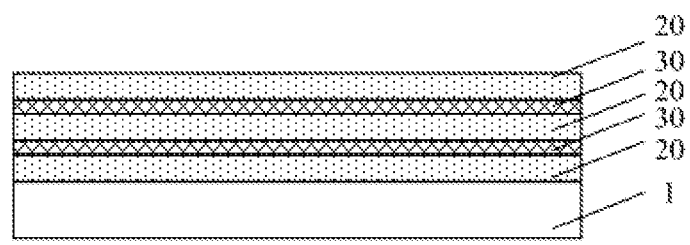

For example, as shown in FIG. 2D, in order to form a structure having three electrode sub-layer films and two separation layer films, a relative thin additional layer of metal separation layer film 30 is sputtered and deposited once again on the substrate 1 on which the electrode sub-layer film 20 has been formed at a normal temperature (e.g., 10° C.-50° C.), and the thickness of this additional separation layer film 30 may also be 50 Å or less; further, an additional amorphous electrode sub-layer film 20 may be sputtered and deposited for the third time on the additional separation layer film 30 at a normal temperature, and the thickness of this additional electrode sub-layer film 20 may also ranges from 400 Å to 1000 Å.

Of course, it should be understood here that, the number of repetitions of forming the additional electrode sub-layer film 20 and the additional separation layer film 30 on the substrate 1 successively is not limited, and can be determined according to the application environment and design requirements of the touch electrode until the thickness of the touch electrode reach the predetermined thickness range. Generally, since the thickness of each of the electrode sub-layers film 20 ranges from 400 Å to 1000 Å and a total number of the separation layer films 30 is preferably 5 or less, the predetermined thickness range is from 800 Å to 6000 Å, preferably from 2000 Å to 5000 Å.

Step S2: performing a patterning process on the amorphous electrode sub-layer films and the separation layer film(s), so as to form a pattern including the touch scanning electrode or the touch sensing electrode.

In the present step, the patterning process includes a lithography process and an etching process. The lithography process refers to a process which includes an exposure process, a development process, and the like and which forms a pattern by using photoresist, a mask, an exposure machine, and the like. The etching process may be a wet etching process or a dry etching process, and etching may be performed once or more times during the etching process so as to finally form a pattern including the touch electrode as predesigned.

Figure 2E:
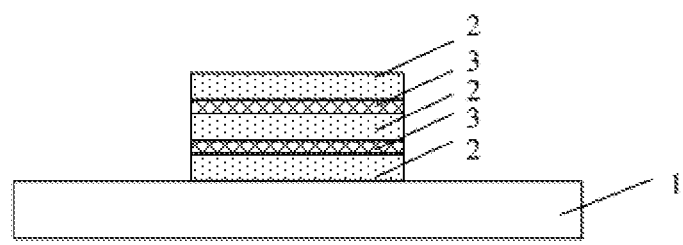

As shown in FIG. 2E, a patterning process is performed on the amorphous electrode sub-layer films and the separation layer films, so as to form a pattern including the touch scanning electrode or the touch sensing electrode. Here, the line-width of the touch scanning electrode or the touch sensing electrode may be relatively small according to the resolution of a product, and the thickness of the touch scanning electrode or the touch sensing electrode may be relatively large. Thus, it can still ensure that the resistance value of the touch scanning electrode or the touch sensing electrode will not be increased significantly. Thus, the timeliness of transmission of scanning signals and voltage signals can be ensured, and the sensitivity of a touch can be ensured.

Step S3: crystallizing the touch scanning electrode and/or the touch sensing electrode made of an electrode material capable of being transformed from an amorphous state into a polycrystalline state.

In the present step, crystallizing the touch scanning electrode and/or the touch sensing electrode made of an electrode material capable of being transformed from an amorphous state into a polycrystalline state is performed by using an annealing process. That is, the substrate 1 on which the step S2 is completed is subject to a heat treatment by exposing the substrate 1 to a high temperature for a period of time and then cooling it down slowly. In the present embodiment, the electrode material, which is capable of being transformed from an amorphous state into a polycrystalline state, in the electrode sub-layer films is transformed from an amorphous state into a polycrystalline state at the same time by using one annealing process.

In the touch electrode according to the present embodiment, by replacing a relatively thin layer (<1000 Å) of electrode material in the prior art with a relatively thick layer (which ranges from 800 Å to 6000 Å, preferably from 2000 Å to 5000 Å) of electrode material, the resistance value of the touch electrode is decreased and thus the signal delay is decreased, which increases the sensitivity of a touch. Furthermore, since a structure in which a relatively thin separation layer is provided in the electrode material is employed, the electrode material which is capable of being transformed from an amorphous state into a polycrystalline state is prevented from being crystallized during the film forming process, thus the etching uniformity of the etching process is increased, so that a rate of qualified product is increased.

Embodiment 2

The present embodiment provides a display panel. The display panel in the present embodiment differs from that according to Embodiment 1 in that, the display panel in the present embodiment may be an organic light-emitting diode (OLED) display panel.

In a case where an OLED in the display panel is a true-color OLED, the display panel may include only an array substrate, and both the touch scanning electrode and the touch sensing electrode are arranged in the array substrate. In a case where an OLED in the display panel is a white OLED (which is simply referred to as WOLED), the display panel may be an array substrate in which a color-filter layer is integrated (this array substrate may be referred to as Color filter on Array, which is simply referred to as COA), and both the touch scanning electrode and the touch sensing electrode are arranged in the array substrate.

The structure and operational principle of the touch electrode according to the present embodiment are the same as those according to Embodiment 1, and the manufacturing method of the touch electrode according to the present embodiment may be the same as that according to Embodiment 1. Thus, detailed description thereof is omitted.

Embodiment 3

The present embodiment provides a display device, which employs the display panel according to Embodiment 1 or 2.

The display device may be any product or component having a display function, such as a liquid crystal panel, electronic paper, an OLED panel, a mobile phone, a tablet computer, a television set, a display, a laptop computer, a digital photo frame, a navigator, and the like.

Since the display panel having a relatively high touch sensitivity and a relatively high rate of qualified product is employed, the display device has better touch quality and better display quality.

In the display panel according to the present invention, by providing the relatively thin separation layer in the relatively thick touch electrode, not only the signal delay during the touch process can be reduced effectively so as to increase the sensitivity of a touch, but also the electrode material used for forming the touch electrode is prevented from being crystallized during the film forming process, thus the etching uniformity of the etching process is increased, so that a rate of qualified product is increased.

It should be understood that, the above embodiments are only exemplary embodiments for the purpose of explaining the principle of the present invention, and the present invention is not limited thereto. For a person having ordinary skill in the art, various improvements and modifications may be made without departing from the spirit and essence of the present invention. These improvements and modifications also fall within the protection scope of the present invention.

What is claimed is:

1. A display panel including a touch scanning electrode and a touch sensing electrode, wherein, one of the touch scanning electrode and the touch sensing electrode is provided with at least one separation layer therein or both the touch scanning electrode and the touch sensing electrode are provided with at least one separation layer therein respectively, the at least one separation layer separates the touch scanning electrode or the touch sensing electrode which is provided with the at least one separation layer into at least two electrode sub-layers, the at least two electrode sub-layers are made of an electrode material capable of being transformed from an amorphous state into a polycrystalline state, and the at least one separation layer is used for preventing the electrode material from being subject to a crystallization reaction before a crystallization process;
wherein the at least one separation layer is made of a metal conductive material having a low resistivity and a light transmittance equal to or greater than 60%;
wherein the electrode material includes any one of or a combination of two or more of indium zinc oxide, indium tin oxide, indium oxide, and zinc oxide.

2. The display panel according to claim 1, wherein, the metal conductive material includes any one of or an alloy of two or more of Cr, W, Ti, Ta, Mo, AlNd, Cu, Ag, and Al.

3. The display panel according to claim 2, wherein, a sum of thicknesses of all of the at least two electrode sub-layers which constitute the touch scanning electrode or the touch sensing electrode and the at least one separation layer is within a predetermined thickness range for the touch scanning electrode or the touch sensing electrode, and the predetermined thickness range is from 800 Å to 6000 Å.

4. The display panel according to claim 3, wherein, a total number of the at least one separation layer is equal to or less than 5, a thickness of each of the at least one separation layer ranges from 10 Å to 50 Å, and a thickness of each of the at least two electrode sub-layers ranges from 400 Å to 1000 Å.

5. The display panel according to claim 1, wherein, the touch scanning electrode and the touch sensing electrode both are strip shape, and are noncoplanar and cross each other.

6. The display panel according to claim 2, wherein, the touch scanning electrode and the touch sensing electrode both are strip shape, and are noncoplanar and cross each other.

7. The display panel according to claim 3, wherein, the touch scanning electrode and the touch sensing electrode both are strip shape, and are noncoplanar and cross each other.

8. The display panel according to claim 4, wherein, the touch scanning electrode and the touch sensing electrode both are strip shape, and are noncoplanar and cross each other.

9. The display panel according to claim 5, wherein, the display panel includes an array substrate, both the touch scanning electrode and the touch sensing electrode are arranged in the array substrate; or the display panel includes a color-filter substrate and an array substrate, the touch scanning electrode is arranged in the color-filter substrate while the touch sensing electrode is arranged in the array substrate, or the touch scanning electrode is arranged in the array substrate while the touch sensing electrode is arranged in the color-filter substrate; or, both the touch scanning electrode and the touch sensing electrode are arranged in the color-filter substrate or in the array substrate.

10. A display device including the display panel according to claim 1.

11. A manufacturing method of a display panel, including steps of forming a touch scanning electrode and forming a touch sensing electrode, wherein, the step of forming the touch scanning electrode and/or forming the touch sensing electrode includes:

forming an amorphous electrode sub-layer film, a separation layer film, and an amorphous electrode sub-layer film successively on a substrate;

performing a patterning process on the amorphous electrode sub-layer film, the separation layer film, and the amorphous electrode sub-layer film, so as to form a pattern including the touch scanning electrode or the touch sensing electrode; and crystallizing the touch scanning electrode and/or the touch sensing electrode made of an electrode material capable of being transformed from an amorphous state into a polycrystalline state, wherein before performing the patterning process on the amorphous electrode sub-layer film, the separation layer film, and the amorphous electrode sub-layer film, the manufacturing method further includes forming additional separation layer films and additional amorphous electrode sub-layer films successively on the electrode sub-layer film which is far away from the substrate, until a sum of thicknesses of all of the amorphous electrode sub-layer films which constitute the touch scanning electrode or the touch sensing electrode and the separation layer films is within a predetermined thickness range for the touch scanning electrode or the touch sensing electrode, wherein the predetermined thickness range is from 800 Å to 6000 Å.

12. The manufacturing method according to claim 11, wherein, the substrate is a color-filter substrate which is used for forming a color-filter layer thereon or an array substrate which is used for forming an array of thin film transistors thereon.

13. The manufacturing method according to claim 12, wherein, the forming of the amorphous electrode sub-layer film is performed by a sputtering deposition process of which a deposition temperature ranges from 20° C. to 30° C., and the forming of the separation layer film is performed by a sputtering deposition process of which a deposition temperature ranges from 10° C. to 50° C.

14. The manufacturing method according to claim 13, wherein the crystallizing of the touch scanning electrode and/or the touch sensing electrode made of an electrode material capable of being transformed from an amorphous state into a polycrystalline state is performed by an annealing process.

* * * * *